(12) United States Patent
Cypher

(10) Patent No.: US 9,110,853 B2
(45) Date of Patent: Aug. 18, 2015

(54) COMPUTER SYSTEM WITH MULTIPLE CLASSES OF DEVICE IDS

(75) Inventor: Robert E. Cypher, Saratoga, CA (US)

(73) Assignee: Oracle America, Inc., Redwood Shores, CA (US)

( * ) Notice: Subject to any disclaimer, the term of this patent is extended or adjusted under 35 U.S.C. 154(b) by 4117 days.

(21) Appl. No.: 10/385,330

(22) Filed: Mar. 10, 2003

(65) Prior Publication Data

US 2004/0181608 A1    Sep. 16, 2004

(51) Int. Cl.
  G06F 15/173    (2006.01)
  G06F 15/16    (2006.01)
  G06F 12/02    (2006.01)
  H04L 29/12    (2006.01)

(52) U.S. Cl.
  CPC ............ *G06F 15/16* (2013.01); *G06F 12/0292* (2013.01); *H04L 61/35* (2013.01); *H04L 61/60* (2013.01)

(58) Field of Classification Search
  CPC ..... G06F 12/00; G06F 12/0292; H04L 61/00; H04L 61/35; H04L 61/60
  See application file for complete search history.

(56) References Cited

U.S. PATENT DOCUMENTS

| | | | | |
|---|---|---|---|---|
| 4,622,631 A * | 11/1986 | Frank et al. | | 1/1 |
| 5,655,079 A * | 8/1997 | Hirasawa et al. | | 709/245 |
| 5,708,831 A * | 1/1998 | Schon | | 709/245 |
| 5,923,853 A * | 7/1999 | Danneels | | 709/238 |
| 6,018,766 A * | 1/2000 | Samuel et al. | | 709/218 |
| 6,085,238 A * | 7/2000 | Yuasa et al. | | 709/223 |
| 6,119,171 A * | 9/2000 | Alkhatib | | 709/245 |
| 6,137,549 A * | 10/2000 | Rasson et al. | | 725/37 |
| 6,182,130 B1 * | 1/2001 | Dolin et al. | | 709/221 |
| 6,332,165 B1 * | 12/2001 | Hagersten et al. | | 709/238 |
| 6,385,647 B1 * | 5/2002 | Willis et al. | | 709/217 |
| 6,453,035 B1 * | 9/2002 | Psarras et al. | | 379/221.08 |
| 6,522,645 B1 * | 2/2003 | Lee et al. | | 370/352 |
| 6,529,882 B1 * | 3/2003 | Park et al. | | 705/51 |
| 6,587,466 B1 * | 7/2003 | Bhattacharya et al. | | 370/395.21 |
| 6,587,876 B1 * | 7/2003 | Mahon et al. | | 709/223 |
| 6,598,071 B1 * | 7/2003 | Hayashi et al. | | 709/203 |
| 6,611,873 B1 * | 8/2003 | Kanehara | | 709/238 |
| 6,668,169 B2 * | 12/2003 | Burgan et al. | | 455/435.1 |
| 6,725,264 B1 * | 4/2004 | Christy | | 709/225 |
| 6,728,356 B1 * | 4/2004 | Carroll | | 379/201.01 |
| 6,763,433 B1 * | 7/2004 | Arimilli et al. | | 711/146 |

(Continued)

FOREIGN PATENT DOCUMENTS

JP    2002368773 A * 12/2002

*Primary Examiner* — Patrice Winder
*Assistant Examiner* — Angela Widhalm
(74) *Attorney, Agent, or Firm* — Meyertons Hood Kivlin Kowert & Goetzel; Stephen J. Curran

(57) ABSTRACT

Various systems and methods implement multiple classes of device IDs. A computer system may include a network, a sending device, and a receiving device. The sending device is configured to encode less than all of a device ID identifying the sending device in a packet before sending the packet on the network. In response to receiving the packet, the receiving device is configured to send a responsive packet to the sending device. The receiving device is configured to encode the entire device ID identifying the sending device in the responsive packet. A portion of the device ID that the initiating device does not encode in the packet identifies the initiating device as one of the devices in a particular device class. Only devices in that device class are configured to send packets having a characteristic of the packet on the network.

8 Claims, 3 Drawing Sheets

(56) References Cited

U.S. PATENT DOCUMENTS

| | | | |
|---|---|---|---|
| 6,772,160 B2* | 8/2004 | Cho et al. | 707/10 |
| 6,931,454 B2* | 8/2005 | Deshpande et al. | 709/248 |
| 6,982,977 B2* | 1/2006 | Marian et al. | 370/392 |
| 7,017,012 B2* | 3/2006 | Clarke et al. | 711/141 |
| 7,028,299 B1* | 4/2006 | Chang | 718/104 |
| 7,124,302 B2* | 10/2006 | Ginter et al. | 713/189 |
| 7,185,113 B1* | 2/2007 | Haberman et al. | 709/250 |
| 7,228,558 B1* | 6/2007 | Lebouill | 725/86 |
| 7,249,374 B1* | 7/2007 | Lear et al. | 726/6 |
| 7,257,118 B2* | 8/2007 | Chase et al. | 370/392 |
| 7,313,819 B2* | 12/2007 | Burnett et al. | 726/15 |
| 7,336,660 B2* | 2/2008 | Pullela | 370/392 |
| 7,356,001 B1* | 4/2008 | Jones et al. | 370/331 |
| 7,370,353 B2* | 5/2008 | Yang | 726/11 |
| 7,526,658 B1* | 4/2009 | He et al. | 713/193 |
| 7,650,424 B2* | 1/2010 | Armitage | 709/238 |
| 7,688,829 B2* | 3/2010 | Guichard et al. | 370/395.31 |
| 2001/0014097 A1* | 8/2001 | Beck et al. | 370/401 |
| 2002/0010782 A1* | 1/2002 | Hoebeke et al. | 709/227 |
| 2002/0143965 A1* | 10/2002 | Aiken, Jr. | 709/229 |
| 2003/0009561 A1* | 1/2003 | Sollee | 709/227 |
| 2003/0154285 A1* | 8/2003 | Berglund et al. | 709/227 |
| 2003/0227487 A1* | 12/2003 | Hugh | 345/777 |
| 2004/0111461 A1* | 6/2004 | Claudatos et al. | 709/200 |

* cited by examiner

COMPUTER SYSTEM WITH MULTIPLE CLASSES OF DEVICE IDS

BACKGROUND OF THE INVENTION

1. Field of the Invention

This invention relates to the field of multiprocessor computer systems and, more particularly, to communication within multiprocessor computer systems.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

Various components within a multiprocessing computer system may communicate with each other during operation. For example, various components may participate in a coherency protocol that involves sending and receiving communications. A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory or from a cache.

Communications sent between components of a multiprocessing computer system may include one or more device IDs. Some communications, which may be sent in order to request a responsive communication, may include the device ID of the component that sent that communication. In such a situation, the device ID may be used by a receiving device in order to return a responsive communication to the sending device. Other communications may include the device ID of the component to which the communication is being sent. Such information may be used to route the communication to a particular device. Some communications may include both the device ID of the sending device and the device ID of the destination device.

Multiprocessing computer systems may include a large number of devices, and thus the size of the device IDs used to identify each device may also be relatively large. This may, in turn, increase the size of the communications sent between devices.

SUMMARY

Various embodiments of systems and methods implementing multiple classes of device IDs are disclosed. In one embodiment, a computer system includes a network, a sending device, and a receiving device. The sending device is configured to encode less than all of a device ID identifying the sending device in a packet. The sending device is coupled to send the packet on the network. In response to receiving the packet, the receiving device is configured to send a responsive packet to the sending device. The receiving device is configured to encode the entire device ID identifying the sending device in the responsive packet. A portion of the device ID that the initiating device does not encode in the packet identifies the initiating device as one of the devices in a particular device class. Only devices in the device class are configured to send packets having a characteristic of the packet on the network.

In another embodiment, a computer system may include at least two groups of client devices. A portion of a respective device ID of each client device in one group may have one value, and the same portion of a respective device ID of each client device in the other group may have another value. Each of the client devices in one of the groups may be configured to encode all but the portion of the respective device ID in a packet. The portion of the device ID that each of the client devices in that group is not configured to encode in the packet may identify a device class, and devices in the device class may be the only devices configured to send packets having a particular characteristic of the packet on the network. For example, the remaining portion of the device ID that each of the client devices in that group is not configured to encode in the packet may identify a class of devices configured to initiate coherence transactions by sending address packets on an address network and the packet may be an address packet sent to initiate a coherence transaction.

BRIEF DESCRIPTION OF THE DRAWINGS

A better understanding of the present invention can be obtained when the following detailed description is considered in conjunction with the following drawings, in which.

Figure 1:
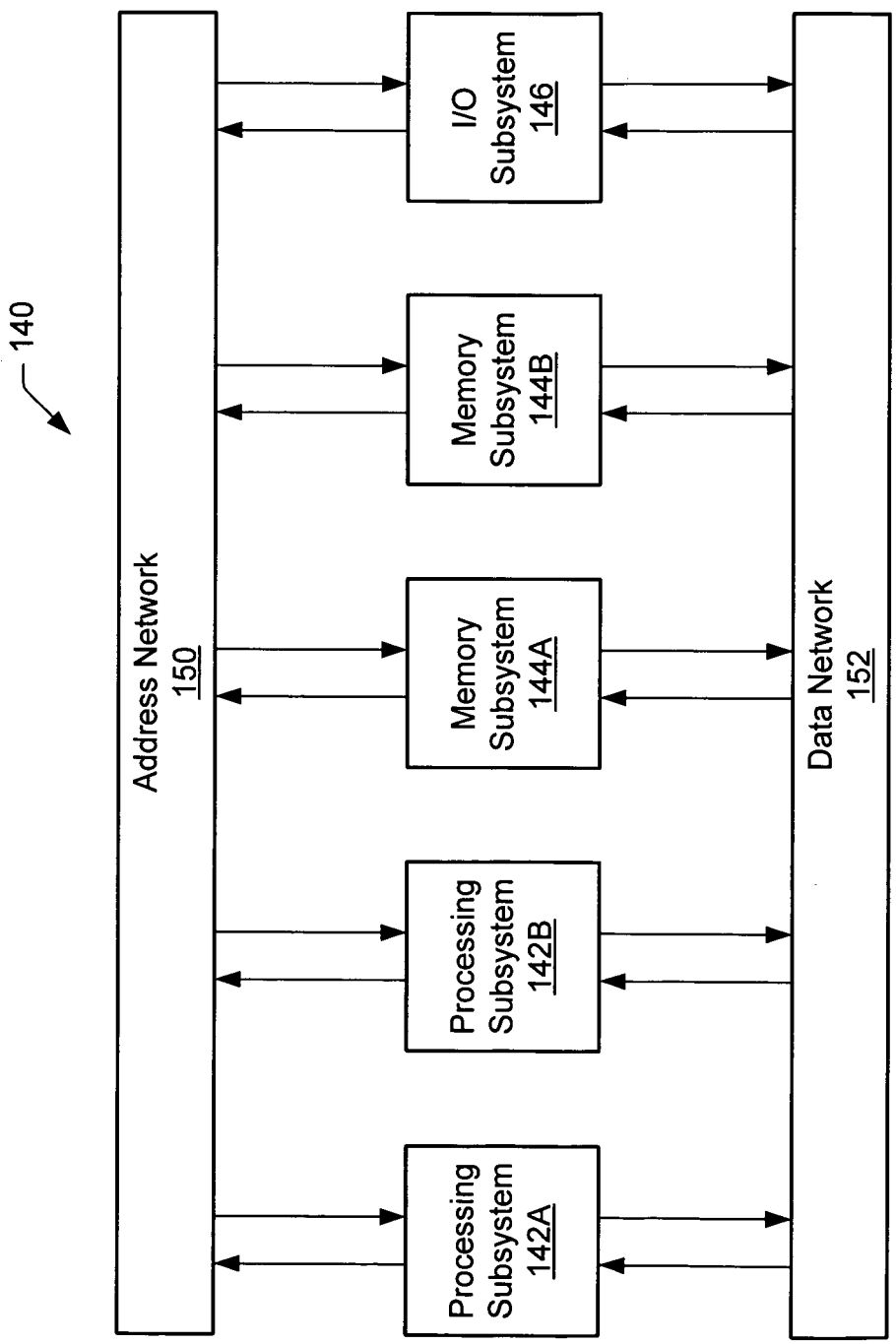
FIG. 1 is a block diagram of a multiprocessing computer system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

FIG. 1 shows a block diagram of one embodiment of a computer system 140 that may implement multiple classes of device IDs. Computer system 140 includes processing subsystems 142A and 142B, memory subsystems 144A and 144B, and an I/O subsystem 146 interconnected through an address network 150 and a data network 152. In the embodiment of FIG. 1, each of processing subsystems 142, memory subsystems 144, and I/O subsystem 146 are referred to as a client device. Each client device may have a unique device ID used to identify that device to each other client device. Different classes of device IDs may be assigned to different client devices, as will be explained in more detail below. It is noted that although five client devices are shown in FIG. 1, embodiments of computer system 140 employing any number of client devices are contemplated. Elements referred to herein with a particular reference number followed by a letter may be collectively referred to by the reference number alone. For example, processing subsystems 142A-142B may be collectively referred to as processing subsystems 142.

Each of processing subsystems 142 and I/O subsystem 146 may access memory subsystems 144. Devices configured to perform accesses to memory subsystems 144 are referred to herein as "active" devices. Because each active device within computer system 140 may access data in memory subsystems 144, potentially caching the data, memory subsystems 144 and active devices such as processing systems 142 may implement a coherency protocol in order to maintain coherency between processing subsystems 142 and memory subsystems 144. Each client in FIG. 1 may be configured to participate in the coherency protocol by sending address messages on address network 150 and data messages on data network 152 using split-transaction packets. Similar packets may be used to participate in other protocols in other embodiments.

Memory subsystems 144 are configured to store data and instruction code for use by processing subsystems 142 and I/O subsystem 146. Memory subsystems 144 may include dynamic random access memory (DRAM), although other types of memory may be used in some embodiments.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Messages upon data network 152 are referred to herein as data packets.

Address network 150 accommodates communication between processing subsystems 142, memory subsystems 144, and I/O subsystem 146. Messages upon address network 150 are generally referred to as address packets. When an address packet references a storage location within a memory subsystem 144, the referenced location may be specified via an address conveyed within the address packet upon address network 150. Subsequently, data corresponding to the address packet on the address network 150 may be conveyed upon data network 152. In one embodiment, address packets may correspond to requests for an access right (e.g., a readable or writable copy of a cacheable coherency unit) or requests to perform a read or write to a non-cacheable memory location. Thus, address packets may be sent by an active device in order to initiate a coherency transaction. Subsequent address packets may be sent by other devices in order to implement the access right and/or ownership changes needed to satisfy the coherence request. In the computer system 140 shown in FIG. 1, a coherency transaction may include one or more packets upon address network 150 and data network 152. Typical coherency transactions involve one or more address and/or data packets that implement data transfers, ownership transfers, and/or changes in access privileges. Communications upon address network 150 may be point-to-point or broadcast, depending on the embodiment. Note that in some embodiments, address network and data network 152 may be implemented using the same physical interconnect.

Classes of Device IDs

Each client device within computer system 140 may have an associated device ID. When communicating, client devices may encode device IDs into packets to identify the packet sender and/or the packet recipient of a particular packet.

Figure 2:
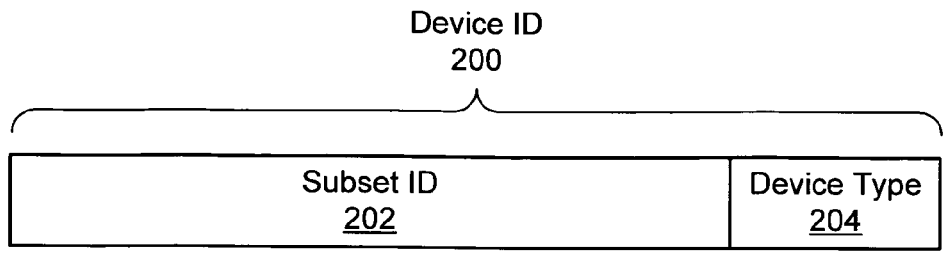
FIG. 2 illustrates a device ID, according to one embodiment.

FIG. 2 illustrates an exemplary device ID 200 that may be used in one embodiment. The device ID 200 of FIG. 2 includes a subset ID 202 and a device class ID 204. The device class ID 204 identifies a particular class of devices. Each client device in the same class of devices has the same device class ID.

Each client device in the same class of devices may have a unique subset ID 202 with respect to other devices in that class. Client devices in different classes, which have different device class IDs 204, may have the same subset ID 202. For example, if there are seven bits of subset ID information in each device ID, there may be up to 128 uniquely identifiable client devices within each device class. Each class may include a client device having a particular subset ID 202, such as 0001101. Accordingly, the same subset ID 202 may be used to identify client devices in different classes.

Client devices may be grouped into classes based on whether each device is configured to generate packets having particular characteristic(s). For example, in the embodiment of FIG. 1, certain devices (e.g., processing subsystems 142) may be able to initiate coherency transactions for cache lines by sending address packets requesting a particular access right to a cache line on address network 150. Other client devices, such as memory subsystems 144, may participate in coherency transactions by sending additional address and/or data packets on the address and/or data networks. However, some of the other devices may not be configured to generate packets that initiate coherency transactions. In such an embodiment, client devices may be grouped into two classes: client devices capable of generating packets that initiate coherency transactions and client devices incapable of generating packets that initiate coherency transactions.

Alternative embodiments may divide client devices into other classes. For example, some client devices may be configured to generate packets that include different commands than other devices. Devices may be divided into classes based on which type of commands those devices are configured to encode in packets. Similarly, some devices may be able to generate packets that request access to data within certain address ranges of data in memory subsystems 144. Other devices may have access to a different address range (e.g., a more limited range of addresses). In such an embodiment, client devices may be subdivided into device classes based on which address ranges those devices are configured to access.

Note also that more than one packet characteristic may be used to classify devices. For example, devices configured to send packets initiating coherency transactions may be additionally subdivided into different classes based on which address ranges those devices are configured to request access to. One device class ID may identify devices configured to initiate coherency transactions for addresses within a first range and another device class ID may identify devices configured to initiate coherency transactions for addresses within a second range. Yet another device class ID may identify devices that are not configured to initiate coherency transactions. In such embodiments, the device class ID 204 may be either an encoded representation (e.g., 01=initiators to the first address range, 10=initiators to the second address range, 11=non-initiators) or a hierarchical representation (e.g., a highest order bit of the device class ID may indicate whether the identified device is an initiator and a next highest order bit of the device class ID may indicate which address range the identified device is configured to access).

The amount of device class ID 204 and subset ID 202 information included in a device ID 200 may also vary among embodiments. The subset ID 202 may be sized to be able to uniquely identify all of the devices within a particular device class. For example, if it is desirable to be able to uniquely identify up to 256 devices per device class, there may be at least eight bits of subset ID 202 information. Note that some device classes may include substantially fewer devices than other device classes. However, subset IDs 202 may be uniformly sized for all of the device classes in many embodiments. The amount of device class 204 information may depend, at least in part, on the number of device classes included in a particular embodiment. For example, a single bit of device class 204 information may be used to differentiate between classes if only two device classes are included.

Use of device IDs 200 that include device class IDs 204 and subset IDs 202 may allow more efficient communications in some embodiments. For example, in many embodiments, only devices in a particular device class may be configured to send a message (e.g., an address or data packet) having a particular characteristic. A device in that device class may be configured to only encode its subset ID 202 in messages having that particular characteristic. Devices that receive the message may identify the sending device based on the subset ID 202 encoded in the message and the device class ID 204 implied by the message characteristic. If a receiving device subsequently communicates with the sending device in response to that message, the receiving device may encode the entire device ID of the sending device in a responsive message. For example, in embodiments in which only devices in a particular device class are configured to access a particular memory address range, an initiating device may encode its subset ID in a message sent to access an address within that address range. Receiving devices (e.g., a memory subsystem 144) may send additional messages (e.g., a data packet containing a copy of the data at the specified address) that include the full device ID 200 of the initiating device. The receiving device may generate the device ID 200 of the sending device from the device class ID 204 of devices that can access addresses within that range and the subset ID 202 included in the initiating message.

Since the device class ID 204 identifying the device class of a sending device may not be included in at least some messages, the size of those messages may be reduced. Alternatively, at least some of the room freed by not including the device class ID 204 in such a message may be used to include other information, such as additional bit(s) used in an error detection and/or correcting code.

Figure 3:
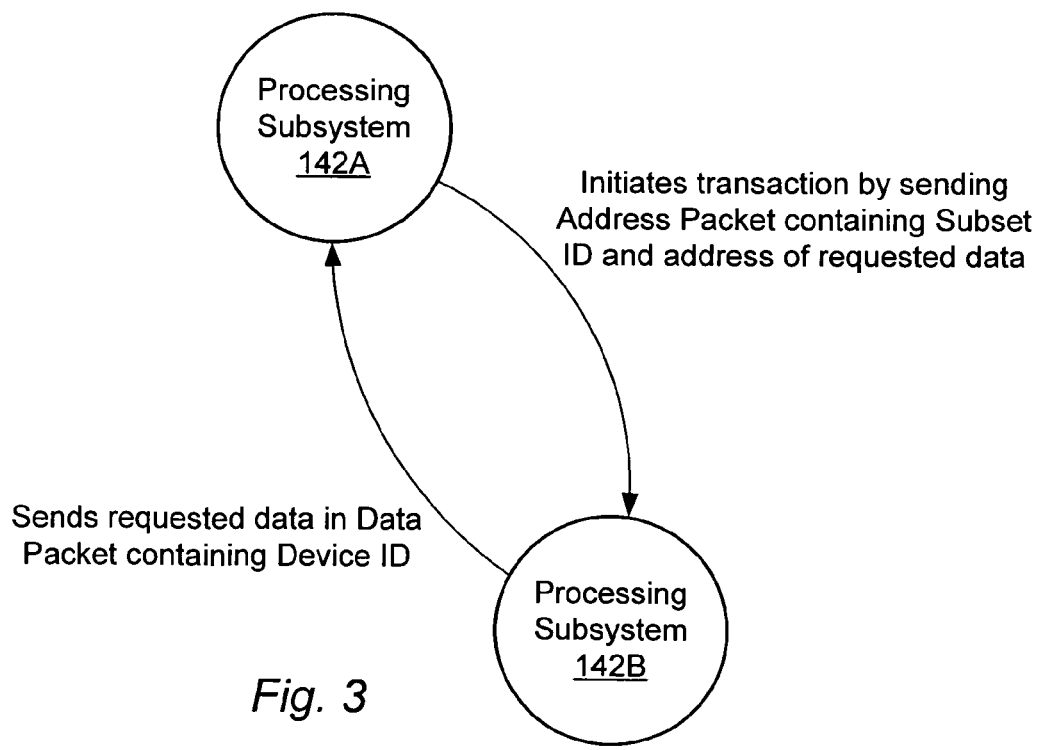
FIG. 3 shows an exemplary exchange of packets between devices, according to one embodiment.
Figure 4:
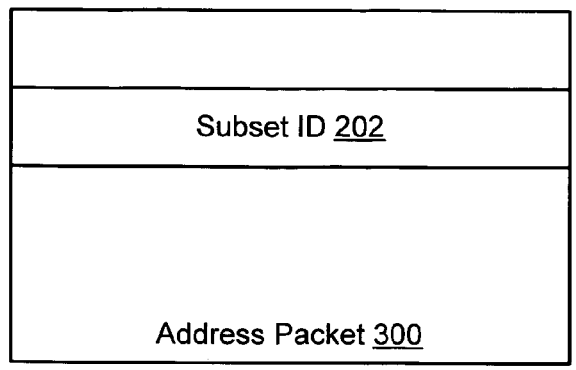
FIG. 4 illustrates an address packet in which only a portion of a device ID has been encoded, according to one embodiment.
Figure 5:
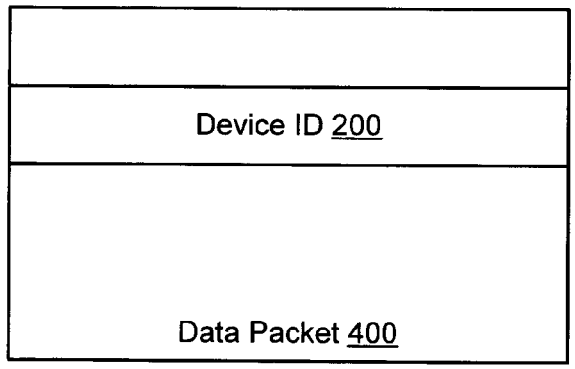
FIG. 5 illustrates a data packet in which a full device ID has been encoded, according to one embodiment.

FIGS. 3-5 illustrate how devices may use device IDs 200 when communicating exemplary address and data packets in one embodiment. FIG. 3 illustrates how a device 142B may send a data packet to device 142A in response to receiving an address packet from device 142A. The initiating device 142A may initiate a coherency transaction by requesting access to a particular cache line by sending an address packet specifying that cache line and the requested access right. If the receiving device 142B is responsible for providing the initiating device with a copy of the specified cache line in response to such a request, the receiving device 142B may send a responsive data packet containing a copy of the specified cache line to the initiating device. Note that the address packet sent by the initiating device 142A may be handled by one or more intervening devices (e.g., a memory subsystem 144) before being provided to receiving device 142B in some embodiments.

In the embodiment of FIG. 3, the ability of a device 142A to send an address packet that initiates a coherency transaction is determined by the device class to which that device belongs. Accordingly, any device that can send an address packet having that characteristic necessarily belongs to a particular device class. Since the device class is readily determined by receiving devices based on characteristics of the packet, the sending device 142A may only encode the subset ID 202 portion of its device ID 200 in the address packet 300, as shown in FIG. 4.

Since there may be more than one device with the same subset ID 202 as the initiating device, the receiving device 144B may be configured to encode the entire device ID 200 of the initiating device 142A in the data packet 400 returned to the initiating device, as shown in FIG. 5. The device ID 200 included in the data packet 400 may be used by the data network 152 when routing the data packet 400 to the identified recipient and/or by the recipient device 142A in order to identify itself as the intended recipient of the data packet 400. Note that the device ID 200 included in the data packet 400 may be part of a data packet prefix used to route the data packet 400 in some embodiments. In some such embodiments, the portion of the data packet 400 that includes the device ID 200 may be included in the packet sent by device 142B on the data network 152 but not included in the packet provided by the data network 152 to the recipient device 142A (i.e., the data network 152 may modify the packet 400 in order to remove routing information prior to providing the data packet to the recipient device 142A).

Figure 6:
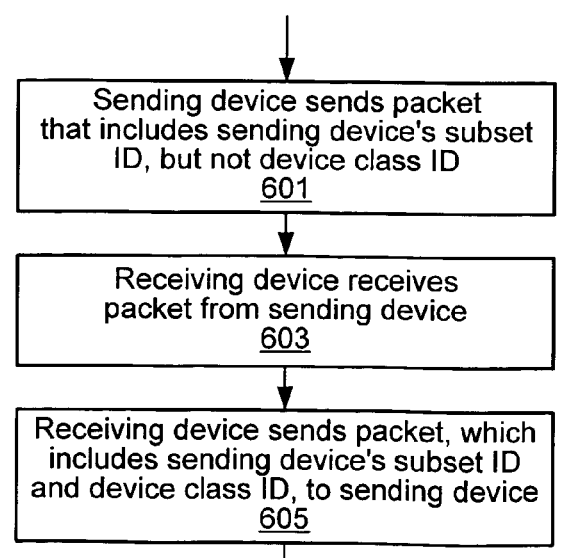
FIG. 6 is a flowchart of a method of operating a computer system, according to one embodiment.

FIG. 6 is a flowchart of one embodiment of a method of communicating between devices in a computer system. At 601, a sending device sends a packet that includes the sending device's subset ID. The packet does not include the device class ID of the sending device. The packet may have a particular characteristic, and only devices in the same device class as the sending device may be configured to send packets having that characteristic. In some embodiments, the sending device may selectively encode either its full device ID or only its subset ID in a packet dependent on whether the packet has that characteristic.

At 603, a receiving device receives the packet sent by the sending device. The receiving device may generate a responsive packet that includes the full device ID of the sending device. The receiving device may generate the full device ID of the sending device from the subset ID included in the packet received at 603 and device class implied by the characteristic of the packet. The receiving device may send the responsive packet to the sending device, as indicated at 605.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a network;
   a first device coupled to the network and configured to send a packet on the network, wherein the first device is further configured to encode a partial device ID in the packet, wherein the partial device ID uniquely identifies the first device as a particular one of a plurality of devices in a device class, wherein devices belonging to a given device class are configured to send packets having a particular characteristic on the network; and
   a second device coupled to the network and configured to receive the packet from the network, wherein the second device is further configured to send a responsive packet to the first device, wherein the second device is configured to encode a device ID that identifies the first device in the responsive packet, wherein the device ID includes the partial device ID and a remaining portion of the device ID, wherein the remaining portion of the device ID identifies the first device as belonging to a particular device class.

2. The computer system of claim 1, wherein the remaining portion of the device ID identifies the first device as one of a plurality of devices configured to initiate coherence transactions by sending address packets on an address network.

3. The computer system of claim 1, wherein the second device is configured to generate and encode the remaining portion of the device ID into the responsive packet in response to the packet having a particular characteristic.

4. The computer system of claim 3, wherein the packet has the particular characteristic if the packet is a type of packet sent to initiate a coherency transaction.

5. The computer system of claim 1, further comprising an other device, wherein a partial device ID of the other device is identical to the encoded partial device ID in the packet sent by the first device, and wherein the device ID of the other device is not identical to the device ID of the first device.

6. The computer system of claim 1, wherein the network comprises an address network, and wherein the first device is configured to send the packet on the address network to initiate a coherence transaction for a cache line, wherein the second device is configured to send the responsive packet on a data network, and wherein the responsive packet includes a copy of the cache line.

7. A system, comprising:
   a transaction-initiating client device, wherein a subset ID portion of a respective device ID of the transaction-initiating client device has a first value;
   a non-transaction-initiating client device, wherein the subset ID portion of a respective device ID of the non-transaction-initiating client device also has the first value, wherein the respective device ID of the transaction-initiating client device is not equal to the respective device ID of the non-transaction initiating client device;
   wherein the subset ID portion uniquely identifies the transaction-initiating client device and the non-transaction-initiating client device as a particular ones of a plurality of client devices in respective device classes, wherein devices belonging to a given device class are configured to send packets having a particular characteristic on the network;
   wherein a remaining portion of the respective device ID identifies the particular device class to which each of the transaction-initiating client device and the non-transaction-initiating client device belongs;
   an address network coupling the transaction-initiating client device and the non-transaction-initiating client device; and
   wherein the transaction-initiating client device is configured to initiate coherency transactions by sending address packets on the address network, wherein the transaction-initiating client device is configured to only encode the subset ID portion of the respective device ID in each address packet.

8. The computer system of claim 7, further comprising a receiving device and a data network, wherein the receiving device is configured to receive an address packet that only includes the subset ID portion of the respective device ID of the transaction-initiating client, wherein the receiving device is configured to generate and encode the respective device ID of the transaction-initiating device in a data packet and to send the packet on the data network.

* * * * *